United States Patent Office
3,097,039
Patented July 9, 1963

3,097,039
PROCESS FOR DYEING NITROGENOUS FIBERS
Arthur Buehler, Rheinfelden, and Richard Casty, Kaiseraugst, Switzerland, assignors to Ciba Limited, Basel, Switzerland
No Drawing. Filed Mar. 28, 1960, Ser. No. 17,795
Claims priority, application Switzerland Apr. 10, 1959
5 Claims. (Cl. 8—43)

Hitherto only two classes of metalliferous dyestuffs have achieved any practical importance for dyeing nitrogenous fibers, more especially wool, namely, on the one hand, the 1:1-chromium complexes of monoazo dyestuffs containing sulfonic acid groups and, on the other hand, the 1:2-chromium and 1:2-cobalt complexes of azo dyestuffs, primarily monoazo dyestuffs, in which the complex molecule (hereinafter called "the complex" for short), contains in the two azo dyestuff molecules which participate in the complex formation and may be identical or different, together at most a single sulfonic acid group or preferably no free sulfonic acid group at all nor a free carboxyl group, that is to say one that does not participate in the complex formation, but does contain as a rule sulfonamide groups or substituents having a similar action, such as sulfone groups or sulfonic acid ester groups.

On the other hand, 1:2-complexes whose molecule contains more than one acid group imparting solubility in water, for example those containing two or more sulfonic acid groups, have hitherto been found practically useless as a rule. Both from a strongly acidic and a weakly acidic bath they produce on wool extremely non-uniform and skittery dyeings as well as weak and flat tints.

Useful to very valuable dyeings of any desired tinctorial strength and satisfactory levelness and good fastness properties can be obtained by producing the aforementioned complexes on the fiber or in some cases during the dyeing operation from metal-free dyestuffs and suitable metal-yielding agents. It is, therefore, easy to understand that this dyeing method, the afterchroming method or the single-bath chroming method, is still widely practiced although it involves considerable disadvantages and difficulties in its performance and, substantial damage to the wool cannot be avoided.

By the present process it is now possible to produce on nitrogenous fibers, more especially wool, with the 1:2-complexes of the aforementioned kind—which otherwise are unsuitable for this purpose—in a very simple manner perfectly level dyeings of any desired tinctorial strength. In the present process for dyeing nitrogenous fibers that are suitable for dyeing with acid dyestuffs the fibers are dyed in an aqueous bath in the presence of a cation-active compound with dyestuffs consisting substantially of 1:2-chromium or 1:2-cobalt complex compounds of azo dyes whose metal complex molecule contains at least two acid groups imparting solubility in water.

The present process is suitable for dyeing nitrogenous fibers than can be dyed with acid dyestuffs in the usual manner, for example silk, polyamide fibers of ε-caprolactam or of adipic acid and hexamethylene diamine. Particularly advantageous results are obtained by the present process in dyeing wool, if desired blended with other nitrogenous or nitrogen-free fibers. When applied to polyamide fibers the present process is particularly advantageous since these fibers are dyed an identical tint, and as a rule also in identical depth, as wool, whereas in the after-chroming process the tint of the unchromed dyestuff is generally retained on polyamide fibers.

The dyestuffs used are 1:2-chromium or 1:2-cobalt complex compounds of azo-dyestuffs, for example disazo dyestuffs or more especially monoazo dyestuffs, that is to say complexes in which two molecules of one azo dyestuff or one molecule each of two different azo dyestuffs are bound in complex union to one atom of chromium or cobalt respectively. The complex may contain, for example, a disazo dyestuff and a monoazo dyestuff or preferably two identical or different monoazo dyestuff molecules. Furthermore, the complex must contain at least two acid groups imparting solubility in water such groups being, for the present purpose, free carboxyl groups (—COO-cation) or more especially free sulfonic acid groups (—SO₃-cation); such carboxyl groups as participate in the formation of the complex do not count as solubilizing groups since, in this kind of linkage, they no longer produce solubility in water. The groups imparting solubility in water may take up any desired positions in the complex. As a rule it is of advantage when the complex contains at least one sulfonic acid group. When the complex contains a total of two solubilizing groups, and the complex-forming metal is referred to by Me and the two dyestuffs by $F_1$ and $F_2$ respectively there are the following possibilities available shown schematically in the table below:

| | 2 —COOH | 1 —COOH+1 —SO₃H | 2 —SO₃H |
|---|---|---|---|
| One dye contains 2 solubilizing groups, one dye contains no solubilizing groups. | (a) 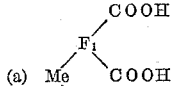 | (c) 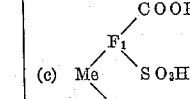 | (e) 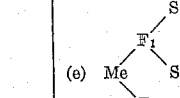 |
| Both dyes contain one solubilizing group each. | (b) 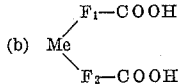 | (d) 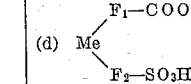 | (f) 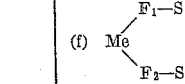 |

Of special advantage are the dyestuffs mentioned under (e) and (f) above—among other reasons because of their ready accessibility—which contain in the molecule of the dyestuff complex two sulfonic acid groups, or quite generally dyestuffs that contain in the molecule of the complex at least two sulfonic acid groups. Special mention deserve those dyestuffs in which, as in the complexes mentioned above under (f), two monoazo dyestuff molecules, each of which contains at least one sulfonic acid group, are bound in complex union to one atom of chromium or cobalt.

Apart from the obvious differences between $F_1$ and $F_2$ in the above cases (a), (c), (d) and (e), the dyestuffs $F_1$ and $F_2$ may in all cases have the same or a different constitution. In other respects the position of the solubilizing groups in the dyestuffs $F_1$ and $F_2$ is as desired; they may be present in the radical of the diazo or coupling component, and if desired 2, 3 or 4 solubilizing groups may be present in one and the same radical. Excessive massing of solubilizing groups, more especially of sulfonic acid groups, is as a rule less advantageous, more especially when a relatively low molecular weight is involved, because this may impair the wet fastness of the dyeings. The presence of, for example, two, three or four sulfonic acid groups in the complex has proved especially advantageous.

The metal complex forming groups in the monoazo dyestuffs are preferably ortho:ortho'-dihydroxyazo groupings or ortho-hydroxy-ortho'-carboxyazo groupings. Other complex forming groups, such as ortho-hydroxy-ortho'-carboxymethoxy groupings or ortho-hydroxy-ortho'-aminoazo groupings are likewise admissible.

In other respects the azo dyestuffs required for the manufacture of the metal complexes may be manufactured in known manner from known diazo and coupling components. Incidentally, a large number of such azo dyestuffs have been known as chroming dyestuffs for a long time past. For the manufacture of such azo dyestuffs there are suitable, for example, ortho-hydroxyamines or ortho-carboxyamines of the benzene and naphthalene series, and as coupling components hydroxybenzenes, hydroxynaphthalenes, 2:4-dihydroxyquinolines, pyrazolones and acetoacetylamino benzenes capable of coupling in vicinal position to a hydroxyl group (or an enolizable keto group).

In this connection the following components may be mentioned:

(1) Diazo components free from groups imparting solubility in water (including ortho-aminocarboxylic acids not containing a further solubilizing group)
(2) Diazo components containing solubilizing groups
(3) Coupling components free from solubilizing groups
(4) Coupling components containing solubilizing groups The 1:2-complexes to be used in the present process can likewise be manufactured in the conventional and as such known manner from metal-free monoazo dyestuffs, advantageously by a method known for the manufacture of 1:2-metal complexes free from groups imparting solubility in water. For the manufacture of symmetrical complexes, in which the metal atom is bound to two identical dyestuff molecules, it is advantageous to treat dyestuff in such manner and with such metal-yielding agents—such as alkali chromesalicylate, chromium acetate, sodium-cobalt tartrate, cobalt acetate or cobalt sulfate—as give direct rise to the desired complex. To these methods belongs the chroming with alkali metal bichromate in the presence of a reducing agent.

To manufacture asymmetrical complexes it is in general advisable to use another method which leads to unitary products and not to mixtures containing a substantial portion of symmetrical by-products, some of which contain no solubilizing group at all and are therefore undesirable. In such a case it is advantageous to prepare the 1:1-chromium complex from one of the two dyestuffs from which the asymmetrical 1:2-complex is synthesized, preferably that dyestuff which contains solubilizing groups (unless both dyestuffs contain solubilizing groups), and the 1:1-chromium complex so formed is then reacted with the other, metal-free dyestuff. It should also be mentioned that the 1:1-complexes as well as the 1:2-complexes of ortho:ortho'-dihydroxyazo dyestuffs can be made not only from the ortho:ortho'-dihydroxyazo dyestuffs themselves but also from the appropriate ortho-hydroxy-ortho'-alkoxyazo dyestuffs. Accordingly there may be used for the direct manufacture of 1:2-complexes—more especially for the manufacture of 1:1-complexes which are subsequently to be made into 1:2-complexes—the appropriate ortho-alkoxydiazo compounds, more especially the methoxy compounds, instead of the ortho-hydroxydiazo compounds.

Under certain conditions the working up of the 1:2-complexes may cause certain difficulties, since these compounds are readily soluble in water. A complex which for this reason does not lend itself to salting out can be isolated by evaporating the reaction mixture or by another suitable method, such as addition of certain water-miscible organic solvents.

The dyeing according to the present process is performed in the presence of a cation-active compound, advantageously one that owes its solubility in water exclusively to groupings containing basic nitrogen atoms and advantageously at least one aliphatic radical of at least 8 connected carbon atoms. Particularly suitable are quaternary ammonium compounds.

Among the last-mentioned compounds may be named more especially the compounds of the formula (1) 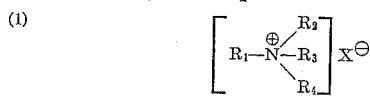

in which $R_1$ represents a preferably unbranched aliphatic hydrocarbon radical containing at least 12, preferably 16 to 20, carbon atoms; $R_2$, $R_3$ and $R_4$ represent lower hydrocarbon radicals, such as ethyl or methyl groups, or two or three of these radicals together with the nitrogen atom represent a hetero ring; and X represents an anion, for example a halogen atom such as bromine or chlorine, or a methosulfate group.

The statement that two or three of the radicals $R_2$, $R_3$ and $R_4$ together with the nitrogen atom form a hetero ring is intended to mean that such a ring is composed either of the nitrogen atom and two of these radicals attached to the nitrogen atom by a simple bond and also to each other, a third radical being present in the form of a lower alkyl group; or that the whole grouping

consists of a hetero ring, the nitrogen atom being linked through a double bond to $R_2/R_3$ and through a single bond to $R_4$, and $R_2/R_3$ and $R_4$ are likewise linked to each other as is the case, for example, with the pyridine ring.

As examples of compounds of the Formula 1 may be mentioned cetyl trimethyl ammonium bromide, cetyl pyridinium bromide and tetradecyl pyridinium bromide.

Likewise suitable cation-active compounds are salts, if desired quaternary ammonium salts of basic condensation products from alkylolamides of higher fatty acids and alkanolamines such, for example, as the acetate of the condensation product from 1 mol of stearic acid methylolamide and 1 mol of triethanolamine.

Furthermore there may be used in the present process as cation-active compounds monoquaternary ammonium salts containing at least one aralkyl radical or cycloalkyl radical or the atomic grouping of the formula (2) 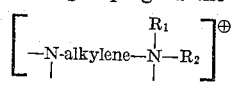

in which $R_1$ and $R_2$ represent alkyl radicals which may be substituted or may be interrupted by hetero atoms, the alkylene radical connecting the two nitrogen atoms containing, if desired, substituents. Particularly suitable compounds are those of the formula (5) 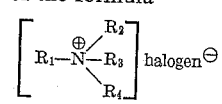

in which $R_1$ represents a preferably straight-chain alkyl radical containing 12 to 18 carbon atoms; $R_2$ and $R_3$ represent alkyl radicals containing one or two carbon atoms, and $R_4$ represents a benzyl or cyclohexyl radical which may be further substituted. As relevant examples may be mentioned dimethylbenzyl lauryl ammonium chloride, dimethylbenzyl-stearylammonium chloride, dihydroxyethyl benzyl lauryl ammonium chloride and dimethyl cyclohexyl lauryl ammonium bromide.

Finally, there may be mentioned as cation-active compounds also quaternary ammonium salts that contain at least two quaternary nitrogen atoms and at least one, or preferably two, higher aliphatic hydrocarbon radicals. These salts correspond, for example, to the general formula (4)
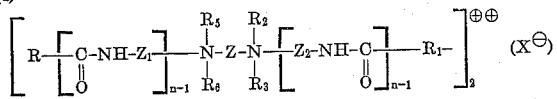

in which R and $R_1$ each represents a higher aliphatic hydrocarbon radical; $R_2$ to $R_6$ represent alkyl, cycloalkyl or aralky radicals which may be further substituted; Z represents an alkylene radical which may be further substituted or may be interrupted by hetero atoms or functional groups; $Z_1$ and $Z_2$ are lower alkylene radicals; $n=1$ or 2; and X represents an anion. Relevant examples are the compounds of the following formulae (5)
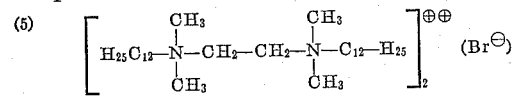

(6)
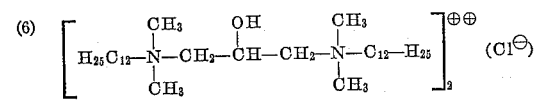

(7)
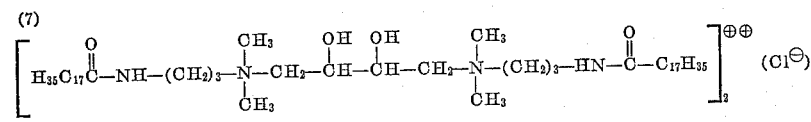

In general, it is of advantage when the dyebath contains a non-ionic dispersant in addition to the cation-active compounds. Particularly suitable dispersants are polyglycol ethers of hydroxy compounds, for example of alkylphenols such as para-nonylphenol or para-tertiary octylphenol or preferably of higher aliphatic alcohols, such as lauryl, cetyl, or octadecyl alcohol; advantageously they are produced by an additive reaction of 10 to 50 mols of ethylene oxide with 1 mol of the selected alcohol. There may also be used polyglycol ethers derived from compounds other than hydroxy compounds, for example from amides of higher fatty acids or from alkylmercaptans with a higher alkyl radical.

The present process gives valuable results both in dyeing proper and in printing. When dyeing from an aqueous bath the amounts of the substances to be added to the dyebaths used in the present process may vary within relatively wide limits. The amount of dyestuff depends of course on the desired tinctorial strength. There may also be used mixtures of complexes of the composition specified above, as well as dyestuffs of a different composition in a minor amount, that is to say up to about 20% of the total amount of dyestuff used, more especially so-called shading dyestuffs. The amount of cation-active compound added is advantageously about 0.25% to 2% of the weight of the wool. The amount of non-ionic dispersant used is advantageously of the same order as that of the cation-active compound.

Furthermore it is found advantageous to dye in an acidic to at most neutral medium so that the pH value of the dyebath ranges from about 3 to 7, preferably from 4 to 6. This pH value can be advantageously adjusted by adding acetic acid or an ammonium salt or a mixture of these substances. There are used, for example, 3 to 8 parts of acetic acid of 40% strength, or 2 to 5 parts of ammonium sulfate or ammonium acetate, per 100 parts of fiber material. It is also of advantage to add to the dyebath an alkali metal salt, for example sodium sulfate.

As is the general practice in dyeing nitrogenous fibers, more especially wool, the present process is performed at an elevated temperature, for example in the following manner: the actual dyeing is begun at about 50 to 80° C., the dyebath is then raised to the boil, and dyeing is continued and completed at the boil. It has, however, been observed that even when dyeing wool by the present process it is not necessary to raise the temperature closely or wholly to the boiling point of the dyebath. As a rule, practically equally good results are obtained when the process is performed well below the boil, for example at a temperature between 80 and 90° C. To ensure that the nitrogenous compound can act from the onset, the material to be dyed can be immersed in the bath which contains the acid, if desired sodium sulfate, as well as the assistant or assistants (i.e. the cation-active compound and if desired the non-ionic dispersant) at room temperature or at most at a moderately raised temperature, whereupon the dyebath is heated and when it is hot an aqueous solution of the dyestuff is added.

If desired dyeing can be carried out continuously, for example by first padding the material to be dyed with a cold, neutral dyestuff solution and then subjecting it to a short after-treatment in a hot acid bath.

The present process is also very suitable for melange printing on worsted slubbings. The printing pastes required for this purpose contain, in addition to at least one dyestuff and one assistant of the specified composition, a thickener such as tragacanth or British gum and it should also contain an acid, for example acetic acid. They may also contain further additives conventionally present in printing pastes, for example oil of turpentine, hydrotropic substances such as urea and/or agents that prevent reduction, such as sodium nitrobenzene sulfonate.

In other respects the procedure known in melange printing may be followed. The printed material is steamed, for example under atmospheric pressure, for 40 to 120 minutes, advantageously with at least one interruption.

The melange prints obtained in this manner are distinguished by good exhaustion of the dyestuff and very good properties of fastness.

The wet fastness, more especially the potting fastness of the dyeings obtained by the present process, can in some cases be considerably increased insofar as migration (bleeding out) is concerned by raising the pH value of the dyebath above 6, for example by adding ammonia, after the fibers have absorbed the desired amount of dyestuff from an acid bath, that is to say at a pH value below 6.

In dyeing mixtures of nitrogeneous fibers and cellulose fibers, for example so-called half-wool, the increased pH value is particularly advantageous since it enables the dyeing to be performed in 2 stages in a single bath: First, the wool share of the fiber mixture is dyed as described above, the cellulose share remaining practically undyed. After raising the pH value, for example with the aid of ammonia, sodium sulfate and then a direct dyeing cotton dyestuff are added, advantageously without further heating. It is of advantage to use dyestuffs that dye wool at most only very slightly in the neighborhood of 100° C. The material is then dyed until also the cellulose fiber displays the desired tint, for example for ½ hour, and the material is then finished in the conventional manner. To improve the wet fastness of the cellulose fiber share it may be of advantage to perform a known after-treatment with an agent capable of improving the wet fastness, for example a condensation product of dicyandiamide and formaldehyde.

Instead of adding the dyestuff and the cation-active compound separately to the dyebath used in the present process, these two substances—and if desired further substances, more especially the non-ionic dispersant—can be made up into stable preparations ready for use. These preparations likewise form an object of the present invention and are characterized in that they contain as dyestuff predominantly 1:2-chromium or 1:2-cobalt complex compounds of monoazo dyestuffs in which the molecule of the metal complex contains at least two acid groups imparting solubility in water, as well as a cation-active compound and, if desired, a non-ionic dispersant.

These preparations can be made by mixing the dyestuff complex with the cation-active compound and, if desired, the dispersant, or by evaporating or atomizing a solution of suspension which contains the dyestuff and the assistant or assistants.

Unless otherwise indicated, parts and percentages in the following examples are by weight:

EXAMPLE 1

100 parts of knitting wool are immersed at 50 to 80° C. in a dyebath containing 3000 parts of water, 10 parts of crystalline sodium sulfate, 6 parts of acetic acid of 40% strength, 1 part of cetyl trimethyl ammonium bromide, 2 parts of the adduct from 1 mol of octadecyl alcohol and 35 mols of ethylene oxide, and 2 parts of the dyestuff described below. In the course of ½ hour the bath is raised to the boil and the wool is then dyed for one hour at the boil, rinsed and dried. A level blue dyeing is obtained. When the cetyl trimethyl ammonium bromide is omitted, a very skittery, slightly greyish, practically useless dyeing is obtained. When instead of the dyestuff described below the 1:2-chromium complex is used which has been obtained in identical manner from the monoazo dyestuff of diazotized 1-amino-2-hydroxynaphthalene-4-sulfonic acid and 1-hydroxynaphthalene, a level blue dyeing is likewise obtained. After immersion of the wool the temperature of the dyebath can then be raised only to 85° C. instead of the boil and dyeing can be continued at this temperature for one hour.

Manufacture of the Dyestuff 41.6 parts of the monoazo dyestuff prepared by coupling diazotized 1-amino-2-hydroxynaphthalene-4-sulfonic acid with 2-hydroxynaphthalene are dissolved in 1000 parts of water and mixed with 100 parts by volume of a sodium chromsalicylate solution containing 2.85% of chromium. Refluxing for several hours completes the metallization. The chromium complex is salted out with sodium chloride, filtered off and dried.

EXAMPLE 2

The process described in Example 1 is carried out with the use of the chromium complex described below. This procedure yields a level, red dyeing, whereas when the same procedure is followed, except that the assistants mentioned are omitted, a more yellowish, skittery dyeing is obtained.

The chromium complex is prepared in the following manner:

A solution of 51.0 parts of the dyestuff prepared by coupling diazotized 4-chloro-2-amino-1-hydroxybenzene-6-sulfonic acid with 1-phenyl-3-methyl-5-pyrazolone-4'-sulfonic acid in 750 parts of water is rendered just slightly alkaline to phenolphthalein with sodium hydroxide. 93 parts by volume of a sodium chromsalicylate solution containing 2.85% of chromium are added, and the mixture is stirred under reflux until the parent dyestuff can no longer be detected. The deep-red solution is neutralized with acetic acid and evaporated to dryness.

EXAMPLE 3

The process described in Example 1 is performed but instead of the chromiferous dyestuffs used in that example one of the undermentioned 1:2-metal complexes obtainable in the conventional manner is used, whereby level dyeings are likewise obtained.

In the 1:2-complexes listed in Table A, two molecules of the same dyestuff are bound in complex union to one atom of metal.

TABLE A

| | Metal | Dyestuff | Tint on wool |
|---|---|---|---|
| 1 | Cr | [structure with $HO_3S$, OH, Cl, -N=N-C, HO, C-N, C=N, $CH_3$, phenyl] | Red. |
| 2 | Co | [structure with $HO_3S$, OH, Cl, -N=N-C, HO, C-N, C=N, $CH_3$, phenyl] | Brown-red. |
| 3 | Cr | [structure with OH, Cl, -N=N-, $HO_3S$, HO, OH] (prepared by coupling diazotized 4-chloro-2-amino-1-hydroxybenzene with 2:8-dihydroxynaphthalene-6-sulfonic acid) | Grey. |
| 4 | Cr | [structure with $HO_3S$, OH, -N=N-C, HO, C-N, C=N, $CH_3$, phenyl] | Pink. |

TABLE A

| | Metal | Dyestuff | Tint on wool |
|---|---|---|---|
| 5 | Co | [structure: 2,4-dinitro-6-hydroxyphenyl–N=N–(1-amino-2-naphthyl with SO₃H)] | Green. |
| 6 | Cr | [structure: 4-chloro-2-hydroxy-6-nitrophenyl–N=N–pyrazolone coupled to naphthalene-1,5-disulfonic acid derivative] | Yellow. |
| 7 | Co | [structure: 1-hydroxy-2-naphthyl(SO₃H)–N=N–pyrazolone-phenyl-SO₃H] | Red-brown. |
| 8 | Co | [structure: 4-chloro-6-sulfo-2-hydroxyphenyl–N=N–pyrazolone-5-carboxylic acid] | Do. |

The 1:2-complexes shown in Table B contain one molecule each of two different dyestuffs bound in complex union to one atom of metal.

TABLE B

| | Metal | 1st Dyestuff | 2nd Dyestuff | Tint on wool |
|---|---|---|---|---|
| 1 | Cr | [structure: HO₃S-naphthol–N=N–hydroxynaphthalenesulfonic acid] | [structure: 4-nitro-2-hydroxyphenyl–N=N–2-naphthol] | Blue. |
| 2 | Cr | [structure: HO₃S-naphthol–N=N–naphthol with NO₂] | [structure: HO₃S, O₂N-hydroxyphenyl–N=N–pyrazolone-(4-chlorophenyl)] | Brown. |
| 3 | Cr | [structure: 4-nitro-2-hydroxyphenyl–N=N–amino-naphthalenesulfonic acid] | [structure: 2-carboxyphenyl–N=N–pyrazolone-phenyl-SO₃H] | Green. |
| 4 | Cr | [structure: HO₃S-hydroxyphenyl(NO₂)–N=N–naphthol] | [structure: HO₃S, Cl-hydroxyphenyl–N=N–pyrazolone-5-carboxylic acid] | Brown violet. |
| 5 | Cr | [structure: HO₃S-naphthol–N=N–hydroxynaphthalenesulfonic acid] | [structure: 4-nitro-2-hydroxyphenyl–N=N–1-amino-2-naphthyl] | Blue. |

EXAMPLE 4

A dyebath is prepared from 5000 parts of water, 3 parts of acetic acid of 40% strength, 4 parts of the adduct from 1 mol of octadecyl alcohol and 35 mols of ethylene oxide, 2 parts of the acetate of the condensation product from 1 mol of stearic acid methylolamide and 1 mol of triethanolamine, and 2 parts of the 1:2-cobalt complex of the dyestuff of the formula

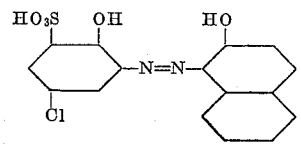

100 parts of a polyamide fabric are immersed in the resulting dyebath at about 50° C., the bath is raised to 95° C., and dyeing is performed for 1 hour at 95° C. The fabric is then rinsed and dried. A level, strong, violet dyeing is obtained.

In an identical manner a fabric of blended fibers of wool and polyamide can be dyed.

EXAMPLE 5

30 parts of the adduct from 35 mols of ethylene oxide with 1 mol of octadecyl alcohol, and 40 parts of dextrin are stirred with 400 parts of water for 15 minutes at 70° C. and the clear solution is treated portionwise with 10 parts of the 1:2-chromium complex prepared as described at the end of Example 1. A solution of 6.5 parts of cetyl trimethyl ammonium bromide in 50 parts of water is then vigorously stirred in. The mixture, which is now opaque but free from sediment, is stirred on for 30 minutes at 70° C. and then evaporated to dryness under vacuum. The residue is gound and there are obtained about 85 parts of a deep-violet readily water-soluble dye preparation which dyes wool, from an acetic acid bath without any additives, level blue tints.

In an identical manner dye preparations of the following compositions can be made:

*(a)*

10 parts of ethylene oxide adduct (see above)
16 parts of dextrin
5.5 parts of cetyl trimethyl ammonium bromide
5.8 parts of dyestuff No. 1 in Table A

*(b)*

10 parts of ethylene oxide adduct (see above)
18 parts of dextrin
5.5 parts of cetyl trimethyl ammonium bromide
8.7 parts of dyestuff No. 3 in Table A

EXAMPLE 6

100 parts of wool are pretreated at the boil for 30 minutes in a bath containing 2 parts of cetyl trimethyl ammonium bromide or 2 parts of the acetate of the condensation product from 1 mol of stearic acid methylolamide and 1 mol of triethanolamine. The wool is then dyed in a fresh bath containing 0.5 part of the dyestuff No. 3 in Table A and 2 parts of acetic acid of 40% strength in 3000 parts of water. A level grey dyeing is obtained.

EXAMPLE 7

100 parts of wool are dyed as described in Example 1 in a bath prepared from 3000 parts of water, 2 parts of the acetate of the condensation product from 1 mol of stearic acid methylolamide and 1 mol of triethanolamine, 1 part of the adduct from 1 mol of octadecyl alcohol with 35 mols of ethylene oxide, 3 parts of acetic acid of 40% strength, and 1 part of the dyestuff No. 3 in Table A. A level grey dyeing is obtained.

The acetate of the composition mentioned above can be replaced by the compound of the formula

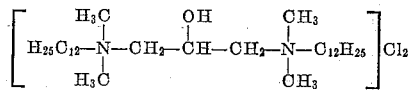

EXAMPLE 8

A dyebath is prepared which contains in 3000 parts of water, 2 parts of cetyl trimethyl ammonium bromide, 1 part of the adduct from 1 mol of octadecyl alcohol with 35 mols of ethylene oxide, 3 parts of acetic acid of 40% strength, and 3 parts of the dyestuff No. 3 in Table A. 100 parts of a mixture of fibers containing 80% of wool and 20% of polyamide staple fiber are immersed at 50° in the dyebath which is then raised to the boil and dyeing at the boil is performed for 1 hour. A level grey dyeing is obtained.

EXAMPLE 9

The process described in Examples 1 to 3 is performed instead of with the ethylene oxide adduct described in those examples, with an adduct from 1 mol of nonyl-phenol with 9 mols of ethylene oxide, or an adduct from 1 mol of castor oil with 40 mols of ethylene oxide, or an adduct from 1 mol of tertiary dodecylmercaptan with 8 to 10 mols of ethylene oxide.

What is claimed is:

1. A process for dyeing wool, which comprises dyeing the wool in an aqueous bath in the presence of a cation active quaternary ammonium compound of the formula

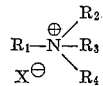

in which $R_1$ represents an aliphatic hydrocarbon radical containing 12 to 20 carbon atoms, $R_2$, $R_3$ and $R_4$ each represent a lower alkyl radical and X represents an anion, and in the presence of a polyglycol ether of a higher aliphatic alcohol with a dyestuff consisting essentially of a 1:2-metal complex compound which compound is selected from the group consisting of chromium and cobalt compounds and contains in the molecule of the metal complex at least two sulfonic acid groups.

2. A process for dyeing wool, which comprises dyeing the wool in an aqueous bath in the presence of cetyl trimethyl ammonium bromide and the adduct from 1 mol of octadecyl alcohol and 35 mols of ethylene oxide, with a dyestuff consisting essentially of a 1:2-metal complex compound which compound is selected from the group consisting of chromium and cobalt compounds and contains in the molecule of the metal complex at least two sulfonic said groups.

3. Process for dyeing wool comprising dyeing said wool in an aqueous bath in the presence of cation active quaternary ammonium compound of the formula

wherein $R_1$ is aliphatic hydrocarbon of 12 to 20 carbons, $R_2$, $R_3$ and $R_4$ are lower alkyl, and X is anion, and in the presence of non-ionic dispersant selected from the group consisting of polyglycol ether of (1) hydroxy compounds, (2) higher fatty acid amides and (3) higher alkyl mercaptans, with dyestuffs consisting essentially of a 1:2-metal complex compound which compound is selected from the group consisting of chromium and cobalt compounds and contains in the molecule of the metal complex at least two sulfonic acid groups.

4. A dyestuff preparation which comprises a cation-active quaternary ammonium compound of the formula

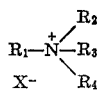

in which $R_1$ is aliphatic hydrocarbon containing 12 to 20 carbons, $R_2$, $R_3$ and $R_4$ are each lower alkyl and X is an anion, a non-ionic dispersant selected from the group consisting of polyglycol ethers of (1) hydroxy compounds, (2) higher fatty acid amides and (3) higher alkyl mercaptans, and a dyestuff consisting of chromium and cobalt compounds and contains in the molecule of the metal complex at least two sulfonic acid groups.

5. Dyestuff preparation of claim 4 wherein the non-ionic dispersant is polyglycol ether of a higher aliphatic alcohol.

References Cited in the file of this patent
UNITED STATES PATENTS

| | | |
|---|---|---|
| 1,970,578 | Schoeller et al. | Aug. 21, 1934 |
| 2,153,701 | Straub et al. | Apr. 11, 1939 |
| 2,674,515 | Widmer et al. | Apr. 6, 1954 |
| 2,763,530 | Schuetz et al. | Sept. 18, 1956 |
| 2,890,094 | Tucker | June 9, 1959 |
| 2,900,218 | Gray | Aug. 18, 1959 |
| 3,903,325 | Geigy | Sept. 8, 1959 |
| 2,933,489 | Biedermann et al. | Apr. 19, 1960 |
| 2,973,351 | Montmollin et al. | Feb. 28, 1961 |
| 3,007,912 | Beffa et al. | Nov. 7, 1961 |

OTHER REFERENCES

Goldsmith: Chemical Industries, March 1943, pp. 326–328.